United States Patent [19]

Diamond et al.

[11] Patent Number: 4,676,894

[45] Date of Patent: Jun. 30, 1987

[54] SUCTION FITTINGS FOR WHIRLPOOL BATHTUBS, AND THE LIKE

[76] Inventors: Harvey E. Diamond, 12953 Woodbridge St., Studio City, Calif. 91604; William A. DeVroom, 629 E. Ada Ave., Glendora, Calif. 91740

[21] Appl. No.: 829,526

[22] Filed: Feb. 14, 1986

[51] Int. Cl.[4] .............................................. B01D 35/02

[52] U.S. Cl. ........................................ 210/167; 4/195; 4/291; 4/292; 4/DIG. 14; 210/194; 210/416.2; 210/435

[58] Field of Search ............... 210/153, 163, 166, 167, 210/169, 194, 416.1, 416.2, 435; 4/541, 559, 195, 196, 286, 290, 291, 292, DIG. 14

[56] References Cited

U.S. PATENT DOCUMENTS 1,380,793 6/1921 Goldman ............................ 210/163

1,693,977 12/1928 Egan .................................. 210/163

*Primary Examiner*—Frank Sever

*Attorney, Agent, or Firm*—Drucker & Sommers

[57] ABSTRACT

It has been found that by mounting a suction cover onto the periphery only of a suction interconnection member placed between the suction cover and the recirculating piping, and by carefully placing the hole pattern and size of the individual holes thereon, that a substantial increase in the allowable flow rate gpm for a given safe suction of below five pounds will be produced, as required by the IAPMO standards. Furthermore, it has been found that the suction cover should provide as clear and unobstructed a path to flow, to the internal bore of the suction interconnect member, as possible, and, to this end, the suction cover itself is completely free of any internal flow obstructions, as is the flow path to the internal bore of the suction interconnect.

10 Claims, 14 Drawing Figures

Fig. 2
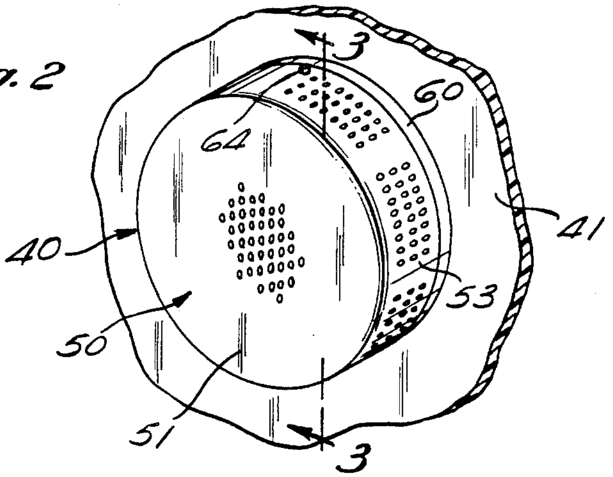
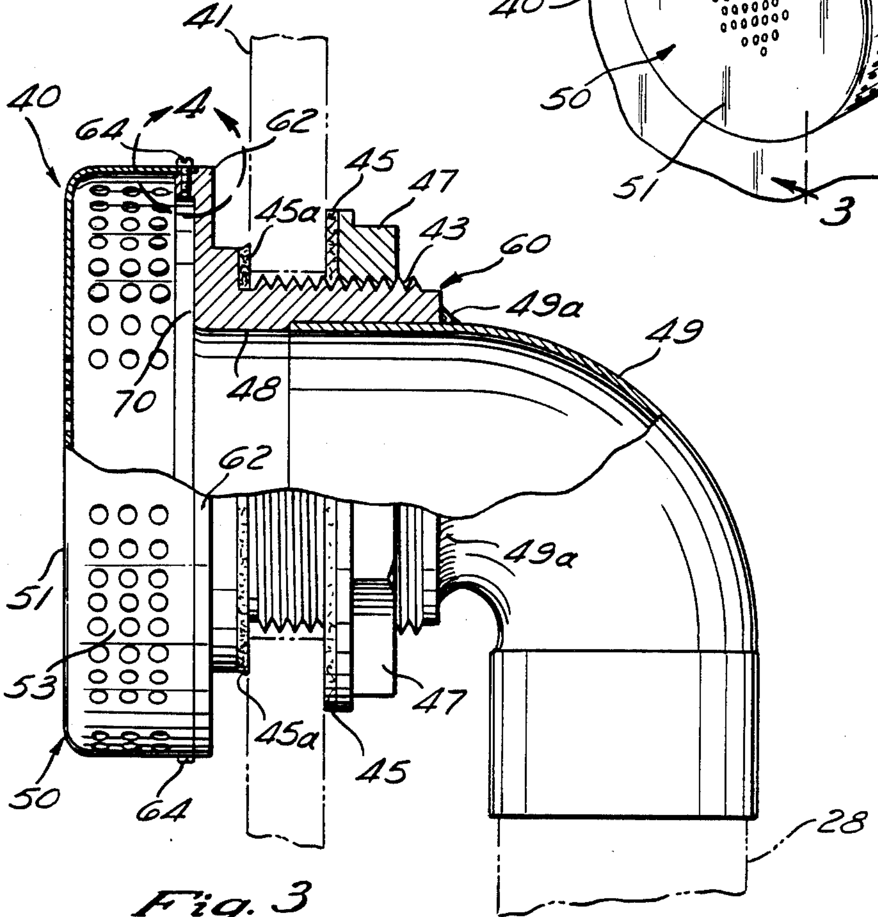
Fig. 3
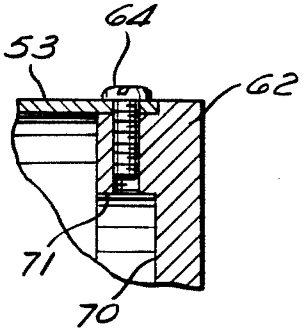
Fig. 4
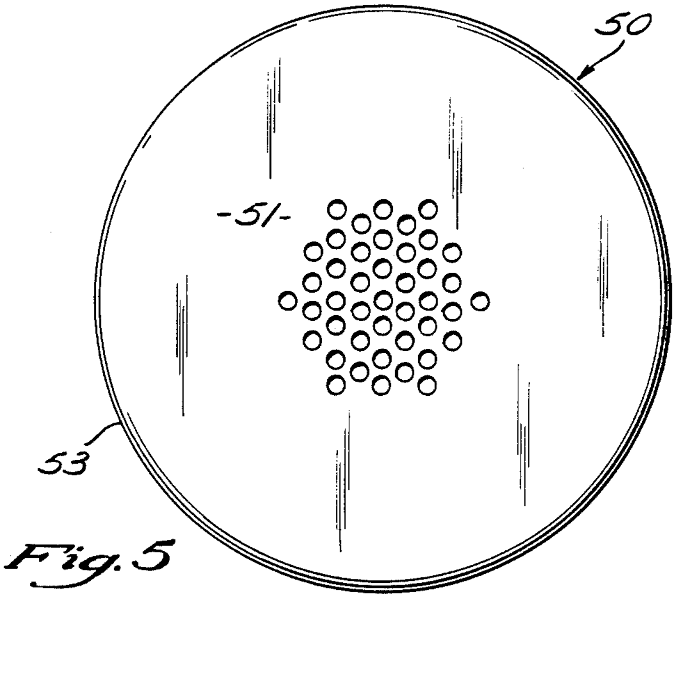
Fig. 5

Fig. 6
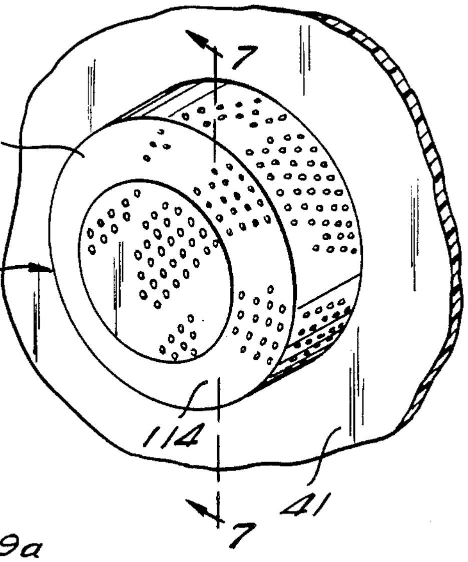
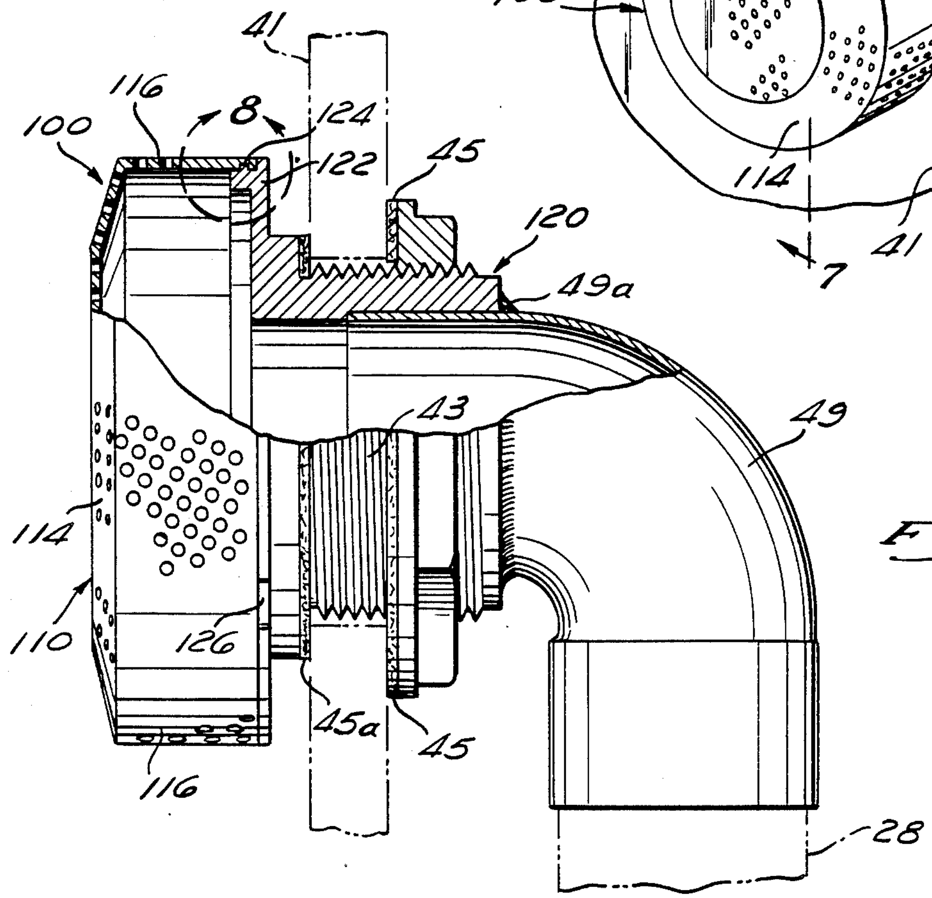
Fig. 7
Fig. 9
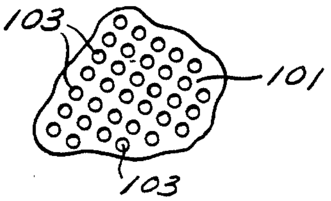
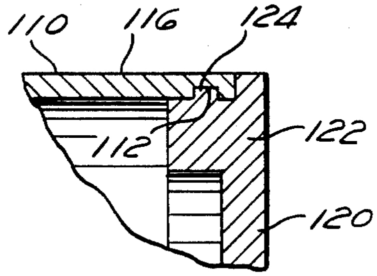
Fig. 8
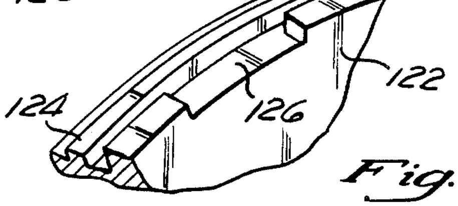
Fig. 10

Fig. 11
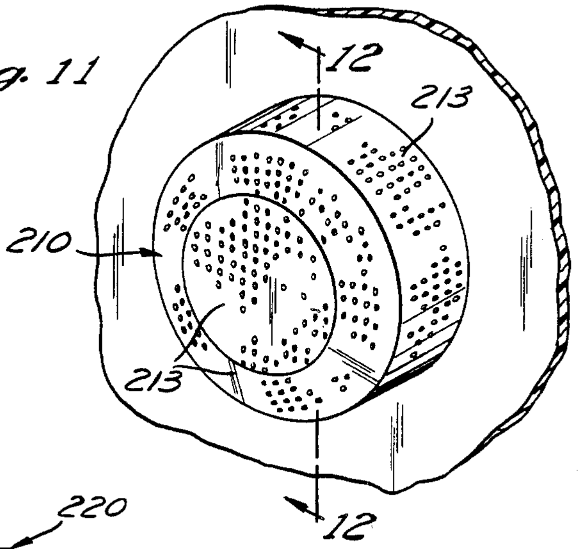
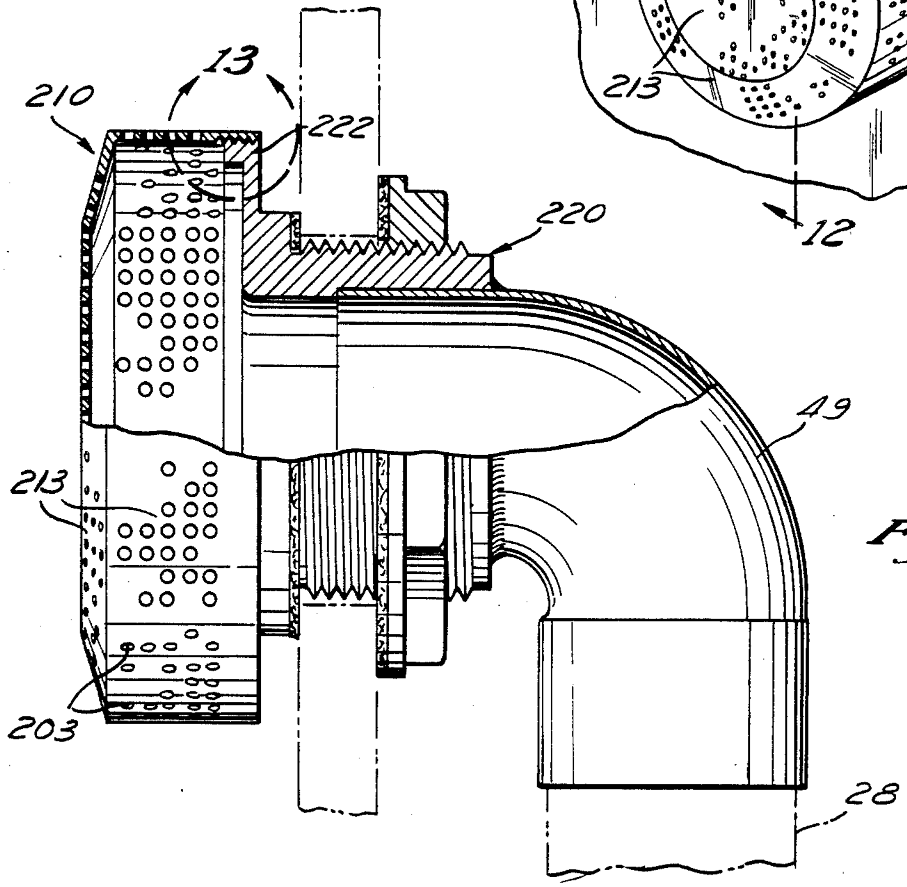
Fig. 12
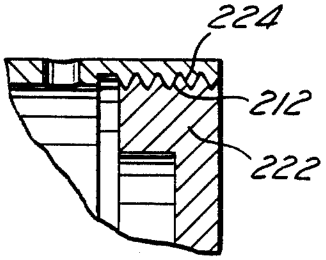
Fig. 13
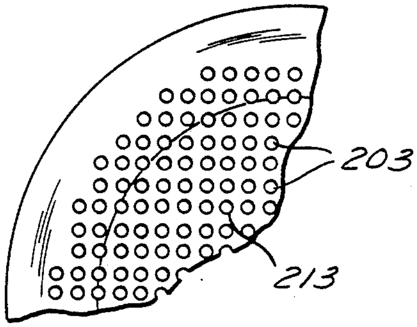
Fig. 14

SUCTION FITTINGS FOR WHIRLPOOL BATHTUBS, AND THE LIKE

BACKGROUND OF THE INVENTION

Whirlpool bathtubs typically are provided with a plurality of jet inlets, each externally connected to a water and air manifold. In the typical installation, water initially filling the whirlpool bathtub is continually recirculated to the water manifold, by means of a pump, and thence back into the tub, through the jets. Each particular whirlpool bathtub, for greater efficiency of operation, has a particular optimal flow rate (gpm) of recirculating water. The water in the tub is recirculated back to the jets through a suction fitting placed near the bottom of the tub. The suction fitting cover is attached to an interconnect member which is, in turn, affixed to the piping carrying the recirculating water back to the water manifold and thence to the jets. Suction fittings of the prior art are typically metallic covers having a plurality of small-sized holes, slots, and the like provided therein, mounted onto the recirculating pipe inlet. Such suction fittings have typically been mounted by means of a central support affixed to the interconnect member.

The problem with such suction fittings has been that long hair of a person using the bathtub may become entrapped within the holes of the suction fitting and/or the central support, mounting it to the pipe inlet. The problem is compounded if a high suction is developed at the flow rate required or employed by the given whirlpool bath system.

Suction fittings for whirlpool bathtubs are rated in terms of the amount of suction, in pounds, generated at a particular flow rate, in gallons per minute (gpm), flowing through the suction fitting. The amount of suction generated at a particular flow rate has become very important, from a safety point of view. Thus, under recently-enacted standards of the International Association of Plumbing and Mechanical Officials (IAPMO Standard SPS 1-83), no more than a five pound pull is permitted at the flow rate required by the particular whirlpool bath plumbing installation.

In view of the foregoing, the need for new types of suction fittings, which have a reduced pull for a given flow rate of recirculating water, is apparent.

BRIEF DESCRIPTION OF THE DRAWINGS

FIG. 2 is an enlarged perspective view of a first embodiment of said suction fitting;

FIG. 3 is a cross-sectional view of the suction fitting taken along the line 3—3;

FIG. 4 is an enlarged fragmentary view taken along the arcuate line 4;

FIG. 5 is a front elevational view of the face of the suction fitting;

FIG. 6 is a perspective view of a second embodiment of the suction fitting of this invention;

FIG. 7 is a cross-sectional view thereof taken along the line 7—7 of FIG. 6;

FIG. 8 is an enlarged fragmentary view taken along the arcuate line 8 of FIG. 7;

FIG. 9 is an enlarged elevational view of the hole pattern of the suction cover shown in FIGS. 6 and 7;

FIG. 10 is an enlarged fragmentary perspective of a peripheral portion of the suction interconnect member of FIG. 7;

FIG. 11 is a perspective view of a third embodiment of the suction fitting of this invention;

FIG. 12 is a cross-sectional view thereof taken along the line 12—12 of FIG. 11;

FIG. 13 is an enlarged fragmentary view taken along the arcuate line 13 of FIG. 12; and FIG. 14 is an enlarged fragmentary elevational view of the front of the suction cover of FIG. 12.

DETAILED DESCRIPTION OF THE INVENTION

Figure 1:
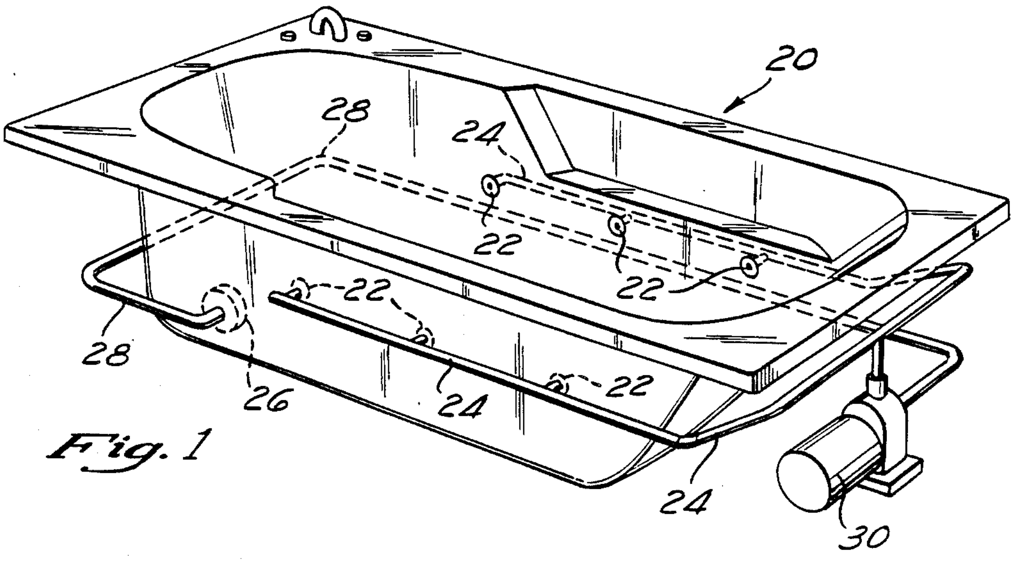
FIG. 1 is a perspective view of a whirlpool bathtub showing, schematically, a typical placement of the suction fitting of this invention.

Referring to FIG. 1, a typical whirlpool bath installation is there schematically shown. The whirlpool bathtub is designated generally by the numeral 20; jets 22 are mounted within the sidewall of tub 20, and are spacedly connected to a pressure manifold 24 carrying water from the tub, through suction fitting 26 and recirculating piping 28, by means of a recirculating pump 30, back to the pressure manifold 24. The air manifold and its interconnections are not shown.

The first embodiment of suction fitting, made of, preferably, brass or plastic, is shown in FIG. 2, mounted to the side wall 41 of the tub 20, and is designated generally by numeral 40. The suction fitting 40 comprises a suction cover 50 and a suction interconnection member 60, to which the suction cover is mounted. The interconnection member 60 is mounted through a slightly oversized opening in the tub side wall 41. The suction interconnection member 60 is provided with external threads 43, and is fixedly and sealingly mounted to said tub sidewall by means of gaskets 45, **45*a*, and internally threaded lock nut 47. The interconnection member 60 is provided with a stepped, central bore 48. At the slightly enlarged rear section of bore 48 is affixed a pipe elbow 49, as by solder ring 49*a*, which elbow 49 is, in turn, affixed to recirculating pipe 28**.

The suction interconnect member 60 is provided with a mounting flange spaced a small distance from the side wall 41 of the tub 20. The spacing is preferred in order that the suction cover 50 of the suction avoid abutment with any large radius curves that may be formed at the bottom of any particular tub, for it is intended that the suction fitting 40 be utilized with a great number of differently shaped configurations of bathtubs, spas, and the like.

The suction cover 50 is, preferably, formed as a unitary member having a circular, flat, perforated face 51 and an annular, perforated edge face 53. The hole pattern on the edge face 53 occupies a substantial portion of the surface area of the edge face 53 and occupies a lesser portion of the surface area of the front face 51. The holes vary in diameter from about 0.090 to 0.115 inches. The diameter of the cover is approximately 3.5–4 inches, and the width of the edge face is about 0.70 to 1 inch. There are no internal obstructions inside of the suction cover.

The periphery of the suction cover 50 fits onto the flange 62 of the interconnection member 60, and is mounted to the periphery of said interconnection by means of a plurality of small-headed screws 64, as best shown in FIG. 4. It is to be noted that the suction cover 50 is peripherally mounted only to the suction interconnect 60. This is a very important feature of the invention. Pursuant to tests conducted by the applicants the IAPMO standards, it is found that the suction fitting 40, as shown and described, would achieve a safe flow rate of 52 gpm (with a 25% safety factor). Employing the same suction cover 50, but mounting it by means of centrally extending support to a suction interconnect member (employed by the prior art), reduces the safe flow rate, when measured by applicants following the IAPMO standards, to 35 gpm. Thus, a very substantial increase in permissible flow rate, of almost 50%, is attained by virtue of the peripheral mounting of suction cover 52 to the suction interconnect member 60.

Referring now to the second embodiment shown in FIGS. 6–10, the suction fitting is generally designated by the numeral 100, the suction cover by the numeral 110, and the suction interconnect by the numeral 120. The suction interconnect 120 is affixed to the tub sidewall 41, as previously described. In this second embodiment, the suction cover 110 is peripherally mounted to the flange 122 of the suction interconnect 120 by means of a peripherally or circumferentially extending retaining ring 124. The peripheral edge of the suction cover 110 is formed with a track 112 within which the retaining ring 124 is press-fitted and retained. Small indented areas 126 are provided at the front of the flange 122 of suction interconnect (see FIG. 10) for the insertion of a flat-bladed screwdriver, or the like, to force the removal of the suction cover 110 from the retaining ring 124.

The hole pattern 101 of the second embodiment of suction fitting 100 extends substantially over the entire surface area of the suction cover 110, an enlarged detail of which is shown in FIG. 9. The hole pattern 101 in this embodiment is designed to permit 50% of the flow through the front face 114 and 50% of the flow through the edge face 116. The individual holes 103 are about 0.063 to 0.125 inches in diameter, and occupy, collectively, preferably, a surface area equal to the diameter of the inlet to the suction interconnect.

In the third embodiment of this invention, the suction cover 210 is peripherally threadably mounted to suction interconnect 220. Thus, in this third embodiment, the flange 222 is externally threaded at 224 and the peripheral edge of the suction cover 210 is internally threaded at 212 to provide the peripheral threadlike mounting. As in the second embodiment, the holes 203 and hole pattern 213 extend over the frontal face and peripheral edge of the suction cover, as best shown in FIGS. 11, 13 and 14.

Referring in particular to the first embodiment of this invention, the front face 70 of the suction interconnect member 60 is substantially planar except for the inner peripheral shoulder 71 which defines the inner body of the mounting flange 62. The flow path to internal bore 48 of the suction interconnect member 60, from and through the suction cover 50, thus proceeds essentially free of internal obstruction. The same free flow path to the internal bores of the second and third embodiments of this invention is also provided.

The suction fitting of this invention may be employed wherever suction is imposed in a fluid system and is not restricted to usage in a whirlpool bath, whirlpool spa, or the like.

The embodiments shown and described herein are presently preferred, but exemplary only. Various modifications of the invention described herein will become apparent to those skilled in the art, and I intend, therefore, to be bound only by the scope of the claims which follow.

I claim:

1. A suction fitting comprising:

a suction interconnect member attached to the water manifold and having a mounting flange on a first face thereof; and a perforated suction cover, peripherally mounted onto the periphery of said mounting flange and said suction fitting is completely free of internal obstructions, and means for enabling said fitting to operate in a bathtub recirculation system which has a pump sized to have less than a five pound pull.

2. The suction fitting of claim 1 wherein:

said perforated cover is provided with a frontal perforated face and a perforated edge face extending rearwardly of said frontal perforated face, said edge face being peripherally mounted onto the periphery only of said mounting flange.

3. The suction fitting of claim 1 wherein:

said suction interconnect member is provided with a central through bore, and perforations in said suction cover occupy a surface area substantially equal to the diameter of the bore of said suction interconnect member.

4. The suction fitting of claim 3 wherein:

said perforated cover is provided with a frontal perforated face and a perforated edge face extending rearwardly of said frontal perforated face, said edge face being peripherally mounted onto the periphery only of said mounting flange, and substantially 50% of said perforations in said suction cover are provided on said frontal perforated face.

5. The suction fitting of claim 1 wherein: said mounting flange of said suction interconnect has a rearwardly extending shoulder, said shoulder preventing said flange from being flush mounted to a bathtub wall, and thereby spacing said flange from said bathtub wall.

6. The suction fitting of claim 1 wherein: said suction interconnect member is provided with throughbore extending rearwardly from said first face, and said first face is substantially planar whereby the flow path of fluid to said throughbore from and through said suction cover, proceeds substantially free of internal obstruction.

7. A suction fitting comprising:

a suction interconnect member adapted to be connected onto a pipe member at the rear thereof and having at the front thereof a mounting flange provided with a first peripheral mounting means; and a perforated suction cover having a second peripheral mounting means interfitting with said first peripheral mounting means, and means for enabling said fitting to operate in a bathtub recirculation system which has a pump sized to have less than a five pound pull.

8. The suction fitting of claim 7 wherein:

said first and second peripheral mounting means are complementary threaded peripheral portions on said perforated suction cover and mounting flange.

9. The suction fitting of claim 7 wherein:

said first and second peripheral mounting means comprise a complementary retaining ring and retaining track.

10. The suction fitting of claim 7 wherein:

said first and second peripheral mounting means comprise aligned holes in each of said suction cover and interconnect members, through which complementary screws are adapted to be threadably mounted.

* * * * *